(No Model.) 2 Sheets—Sheet 1.
C. L. DOLL.
COMMODE, EARTH CLOSET, OR SIMILAR APPLIANCES.
No. 388,541. Patented Aug. 28, 1888.
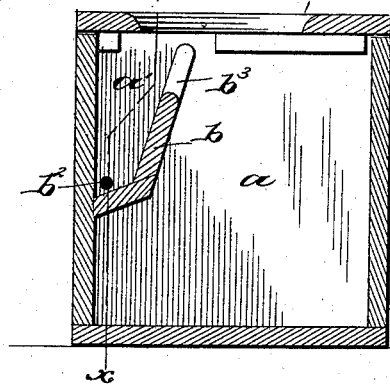
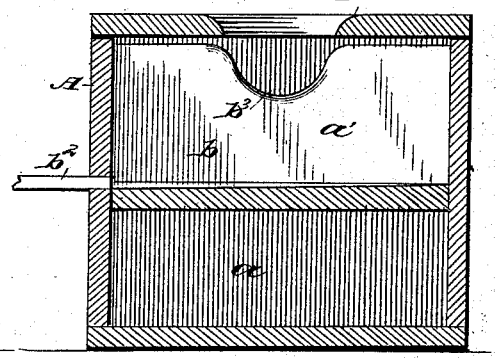
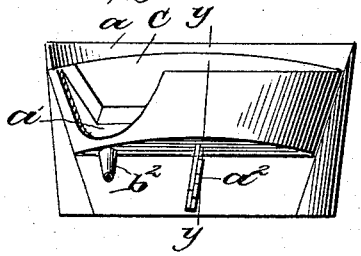
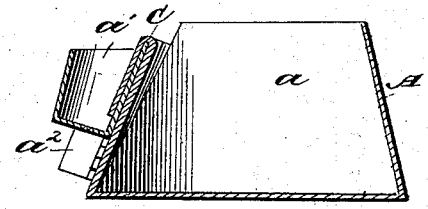
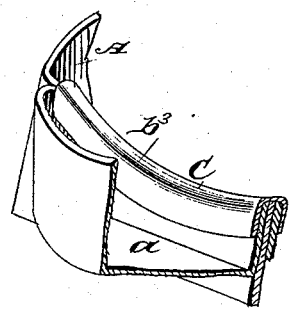
WITNESSES:
W. R. Davis
C. Sedgwick
INVENTOR:
C. L. Doll
BY Munn & Co
ATTORNEYS.

(No Model.) 2 Sheets—Sheet 2.
C. L. DOLL.
COMMODE, EARTH CLOSET, OR SIMILAR APPLIANCES.
No. 388,541. Patented Aug. 28, 1888.
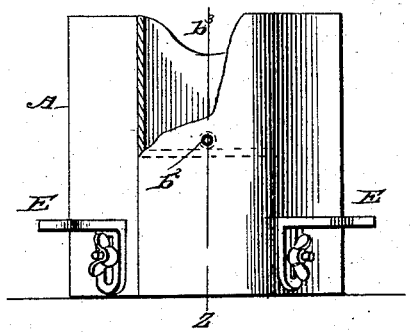
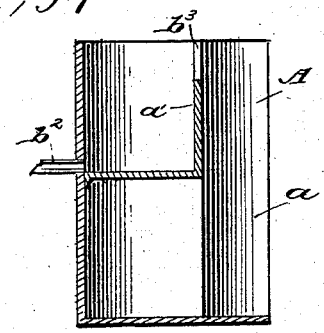
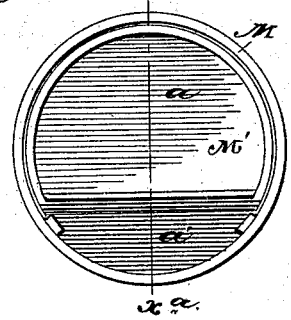
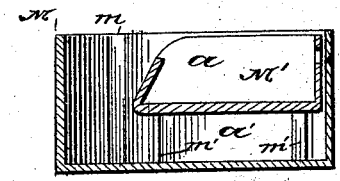
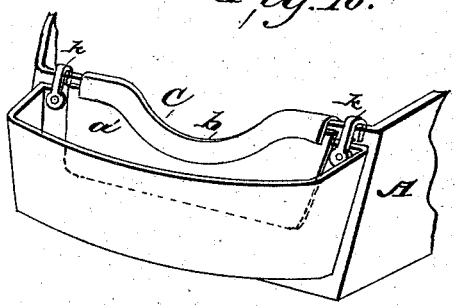
WITNESSES:
W. R. Davis.
C. Sedgwick.
INVENTOR:
C. L. Doll.
BY Munn & Co.
ATTORNEYS.

UNITED STATES PATENT OFFICE.

CHARLES L. DOLL, OF ST. JOSEPH, MISSOURI.

COMMODE, EARTH-CLOSET, OR SIMILAR APPLIANCE.

SPECIFICATION forming part of Letters Patent No. 388,541, dated August 28, 1888.

Application filed November 2, 1887. Serial No. 254,053. (No model.)

*To all whom it may concern:*

Be it known that I, CHARLES L. DOLL, of St. Joseph, in the county of Buchanan and State of Missouri, have invented new and Improved Commodes, Earth-Closets, or Similar Appliances, of which the following is a full, clear, and exact description.

My invention relates to an improvement in commodes, earth-closets, or similar appliances, and has for its object to provide special— either separably or inseparably connected— receptacles for the urine and for the fæces, to receive these excrements directly apart without change of position or without inconvenience to the person, and to keep them separate.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a central vertical section through a commode having my improvement applied. Fig. 2 is a vertical sectional view on line $x\,x$ of Fig. 1. Fig. 3 is a sectional view of a modified form. Fig. 4 is a section through line $y\,y$ of Fig. 3. Fig. 5 is a sectional view of a modified form of Fig. 3. Fig. 6 is a modification of Fig. 1. Fig. 7 is a vertical section on line $z\,z$ of Fig. 6. Fig. 8 is a plan view of a pot having two separate compartments. Fig. 9 is a vertical section on line $x^a\,x^a$ of Fig. 8, and Fig. 10 is a further modification of Fig. 3.

In carrying out the invention, a receptacle, A, is provided, as illustrated in Figs. 1 and 2, for use by the male sex only. The said complete receptacle is preferably rectangular in form, but may be made of any desired shape, and be inclosed within an outer receptacle also, if desired, in which event it is not provided with a top. When used, as above shown, the top or seat A', which is detachable, is employed in direct connection with the body. The body or receptacle A is divided into two independent separably or inseparably connected compartments, $a$ and $a'$—one compartment, $a$, for the fæces, and the other, $a'$, for the urine, the latter being the smallest. This is effected by means of a single partition, $b$, which, attached to the front slightly below the center and extended upward and rearward transversely the receptacle, imparts a trough-like shape to the compartment $a'$. The bottom of said compartment $a'$ is preferably made to incline to one end of the receptacle, where a tube, $b^2$, is provided, adapted to carry the urine away. Centrally of the partition $b$, in alignment with the seat-aperture, a concavity, $b^3$, is formed to receive and accommodate the testes.

In Figs. 3 and 4 a modification is shown in which the fæces-compartment $a$ has an inclined front and a shield, C, attached to said front, adapted to extend downward. About half-way beneath this shield, in contact with the front of the compartment $a$, the inner edge of the urine-receptacle $a'$ is slid, supported in position by a hinged leaf, $a^2$, attached to the front of said compartment $a$ beneath the receptacle $a'$, which receptacle is readily detached, and is provided with an outlet or waste pipe, $b^2$.

In Figs. 6 and 7 a form of commode is illustrated, in which the urine compartment $a'$ forms a projection centrally, the fæces-compartment $a$, adapted to extend downward but half-way the projection and having the usual outlet-pipe, $b^2$. At each side of the projection, attached thereto and to the front compartment, $a$, an adjustable shelf, E, is attached, whereupon a person of the male sex may place his feet, the legs being adapted to extend downward at each side of the projection, the said projection being formed with the necessary concavity in the top, as shown in Fig. 6. The shelves may be so adjusted that a large or small person may, if he prefers, stand upon the said shelves and assume a standing or squatting position instead of a sitting one.

Figs. 8 and 9 illustrate my invention as applied to a chamber-pot. The pot proper, M, is provided with opposing vertical guides $m$ and three or more spaced supports, $m'$, adapted to extend vertically upward a distance from the bottom, upon which supports, held in position by the guides $m$, a semicircular receptacle, M', is adapted to rest, its upper edge about flush with the upper edge of the pot and the front edge below the same and beveled outward, as shown in Fig. 9. The pot is adapted to hold and receive the urine, and the semicircular receptacle the fæces, which receptacle is readily removed by means of suitable handles, and may not be positioned in the pot until wanted. The outer receptacle may be used in the ordinary manner as a pot. This device is specially adapted for a sick room.

Figs. 5 and 10 are modifications of Figs. 3 and 4, and while the latter may be used by the female sex the former are specially adapted for the male sex. The partition $b$ is concaved centrally the upper edge, and likewise the upper edge of the shield attached to the body A to accommodate the testes. The urine-receptacle $a'$, instead of being supported by a hinged bracket, as in Fig. 3, is provided with hooks $k$, secured to the upper edge at each end, adapted to engage the top front surface of the said body A.

In Fig. 5 the shield and urine-receptacle are made integral, and the said receptacle is held to the body, simply hooking the shield over the front top surface of said body, which front surface in both the aforesaid illustrations is inclined from the top outward and downward.

Having thus described my invention, what I claim as new, and desire to secure by Letters Patent, is—

1. In a commode, earth-closet, or similar appliance, the combination, with the body thereof divided into two compartments, one for urine and one for fæces, of a detachable metal shield inclined rearward, having a central concavity in its upper surface and extending from side to side of the body beneath the seat-aperture, embracing the top of the partition, and an outlet-pipe leading from said urine-compartment, substantially as shown and described.

2. A commode, earth-closet, or similar appliance, provided with a separate compartment for urine and for fæces, the dividing-wall inclined rearward and extending from side to side of the body beneath the seat-aperture, and provided with a central concavity in its upper edge in alignment with the seat-aperture, and means, substantially as shown and described, for conveying the urine from the appliance, as set forth.

CHARLES L. DOLL.

Witnesses:
HARRY W. ATOR,
J. C. HEDENBERG.